(12) United States Patent
Li

(10) Patent No.: US 7,555,862 B2
(45) Date of Patent: Jul. 7, 2009

(54) METHOD FOR CONSERVING SOIL AND WATER BY INTEGRATING BOTANICAL NET BODY AND SOFT FRAMEWORK

(76) Inventor: Piao-Chin Li, No. 18, 2nd Neighborhood, Jinshih Village, Sihu Township, MiaoLi County 368 (TW)

( * ) Notice: Subject to any disclaimer, the term of this patent is extended or adjusted under 35 U.S.C. 154(b) by 387 days.

(21) Appl. No.: 11/396,691

(22) Filed: Apr. 4, 2006

(65) Prior Publication Data
US 2006/0233611 A1 Oct. 19, 2006

(30) Foreign Application Priority Data
Apr. 15, 2005 (TW) .............................. 94112015 A

(51) Int. Cl.
*A01G 13/00* (2006.01)
*A01G 9/02* (2006.01)
*A47G 7/08* (2006.01)
*E21D 20/00* (2006.01)

(52) U.S. Cl. ................. 47/31; 47/65.7; 47/78; 405/302.7

(58) Field of Classification Search ........ 47/31, 47/65.8, 78, 1.01 F, 1.01 T, 65.7, 65.9, 32.7, 47/39; 405/302.6, 302.7, 302.4, 15, 16, 19
See application file for complete search history.

(56) References Cited
U.S. PATENT DOCUMENTS
2,201,279 A * 5/1940 Willing .................... 405/16
3,848,359 A * 11/1974 Seith et al. ................ 47/56

* cited by examiner

*Primary Examiner*—Michael R Mansen
*Assistant Examiner*—Monica L Williams
(74) *Attorney, Agent, or Firm*—Rosenberg, Klein & Lee

(57) ABSTRACT

A method for conserving soil and water comprises a botanical net body and a soft framework system for supporting the net body, and the net body is mainly made of straws, fabrics, and meshed materials similar to a net woven with flat and curve surfaces, combined with a frame, or directly coupled to the interior of the framework for filling soil into its hollow portion. The framework includes anchoring elements, multidirectional connecting rings and connecting elements between the rings, and the net body is connected to the framework by connecting the net body with a preassembled soft framework and anchoring the two together for filling soils and growing plants or solely anchoring the framework with the net body. After the net body is filled with soils and grown with plants, the net body is moved to the place of the framework and connected to the framework.

11 Claims, 7 Drawing Sheets

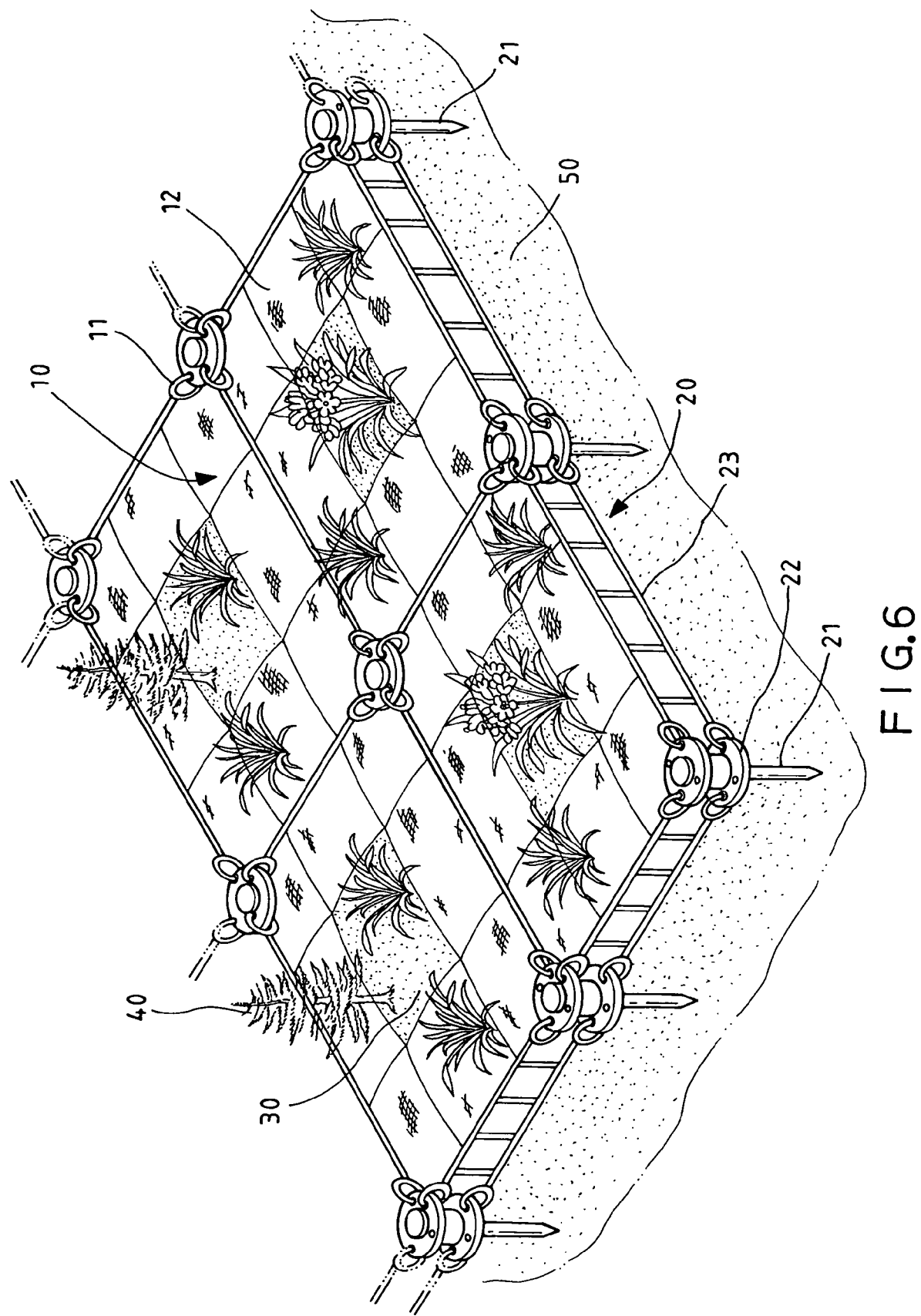

METHOD FOR CONSERVING SOIL AND WATER BY INTEGRATING BOTANICAL NET BODY AND SOFT FRAMEWORK

BACKGROUND OF THE INVENTION

1. Field of the Invention

The invention relates to a method for conserving soil and water, and more particularly to a soil and water conservation construction by independently or jointly growing or transplanting plants at site to form a three-dimensional structure after the construction is completed, and the method is used for protecting plants on hillside lands or beautifying constructions such as a retaining wall or a dam by planting a vegetation on the constructions or decorating the constructions with the vegetation.

2. Description of the Related Art

There are various different soil and water conservation methods including a prestressed girder method, a free girder method, and a piling and grating method, etc. The prestressed girder method uses a prestressed anchor to fix and support a girder, and the hollow portion of the girder is filled with soil and planted with plants. The free girder method uses an anchor rod to fix the girder. Similar to the prestressed girder method, the hollow portion of the girder is filled with soil or soil bags for vegetations. The difference resides on that the main function of the prestressed anchor is used for preventing soil slides along the slopes, and the free girder is used for protecting the slope surface only. The piling and grating method uses bamboos and wooden piles to support the grates for filling soils and growing plants and facilitate beautifying the land with plants or trees.

Basically, these methods have the following features:

1. The surface of the construction built by these methods is planarized to simplify the complexity of construction, and the construction is built with the same structure and dimensions along the slope. Thus, the planarization is unfavorable for the soil conservation, and the slope may be eroded by rain or water and the growing effect for plants will drop. Therefore, it is necessary to have drainage to protect the constructions.

2. These methods come with a single function only. Without any special accessory method, the aforementioned soil and water conservation methods can be used for protecting slopes only and cannot be used for other purposes such as beautifying the constructions.

3. These methods require many accessory items such as the prestressed girder method requires casting the girder, building a construction framework for a higher or steeper slope to work with a moldboard of the girder, assembling the steel bars, or performing the concrete casting. In fact, the prestressed girder method also requires the same items.

4. These methods have many limitations on the slope, such as it involves a different wooden piling and a poor soil conservation effect when building the piles and grates on a steep slope, and thus greatly reducing the effect for vegetations.

5. Lots of slope finishing jobs are performed for the purposes of making the construction successful and reducing the falling rocks during or after the construction. Thus, it is necessary to remove loose soils and stones and incur a heavy workload. Furthermore, it is uneasy to remove the soils and stones.

6. Vegetation mainly fills fertile soil with seeds, and this point is affected by the vegetation concept of growing grasses evolved to growing trees and also directly related to the structure adopted by the method itself. For example, vegetations are carried out at the hollow portion of the prestressed girder by filling or stuffing which is the most appropriate method for the structure of the construction. Thus, grasses that can grow fast and have deeper roots are generally used, and trees and local prototypes are planted afterward. Therefore, the growth of grasses builds a secured foundation for the vegetation on the slope, and various plants are introduced for beautifying and remedicating the land, but such method is affected by the weather easily. Thus, the effect of vegetation cannot be controlled easily.

7. These methods cannot use transplantations for the construction. In the structure of each method, various plants have to be cultured first and then transferred to the slope for the vegetation, and such arrangement is very difficult without adopting other special methods.

There are many known soil and water conservation methods including the prestressed girder method, free girder method, and piling and grating method, etc. From their characteristics, each method produces a planarized structure that will be eroded by rain or water easily, and thus related water constructions are needed to maintain the slope and the effect of the vegetation. Before starting a construction, loose soils and stones must be removed first and thus involving tremendous workloads. The construction is also affected by the geometric shape of the slope, and thus requiring a construction framework to facilitate each construction job. Basically, each method can be used for one purpose only, and the construction by the transplanted vegetation method is very difficult.

SUMMARY OF THE INVENTION

In view of the shortcomings of the prior art, the inventor of the present invention based on years of experience to conduct extensive researches and experiments to overcome the foregoing shortcomings, and finally invented a method for conserving soil and water by integrating botanical net body and soft framework in accordance with the present invention.

Therefore, it is a primary object of the invention to provide a multi-functional method that can complete a three-dimensional slope, and reduce water construction jobs or require no water construction at all. The invention also can simplify the complexity of the construction and require no framework for the construction. Further, the invention is a soil and water conservation method that adopts a transplanting method for the vegetation.

BRIEF DESCRIPTION OF THE FIGS

FIG. 6 is a schematic view of an application of the invention.

DETAILED DESCRIPTION OF THE PREFERRED EMBODIMENT

Figure 1:
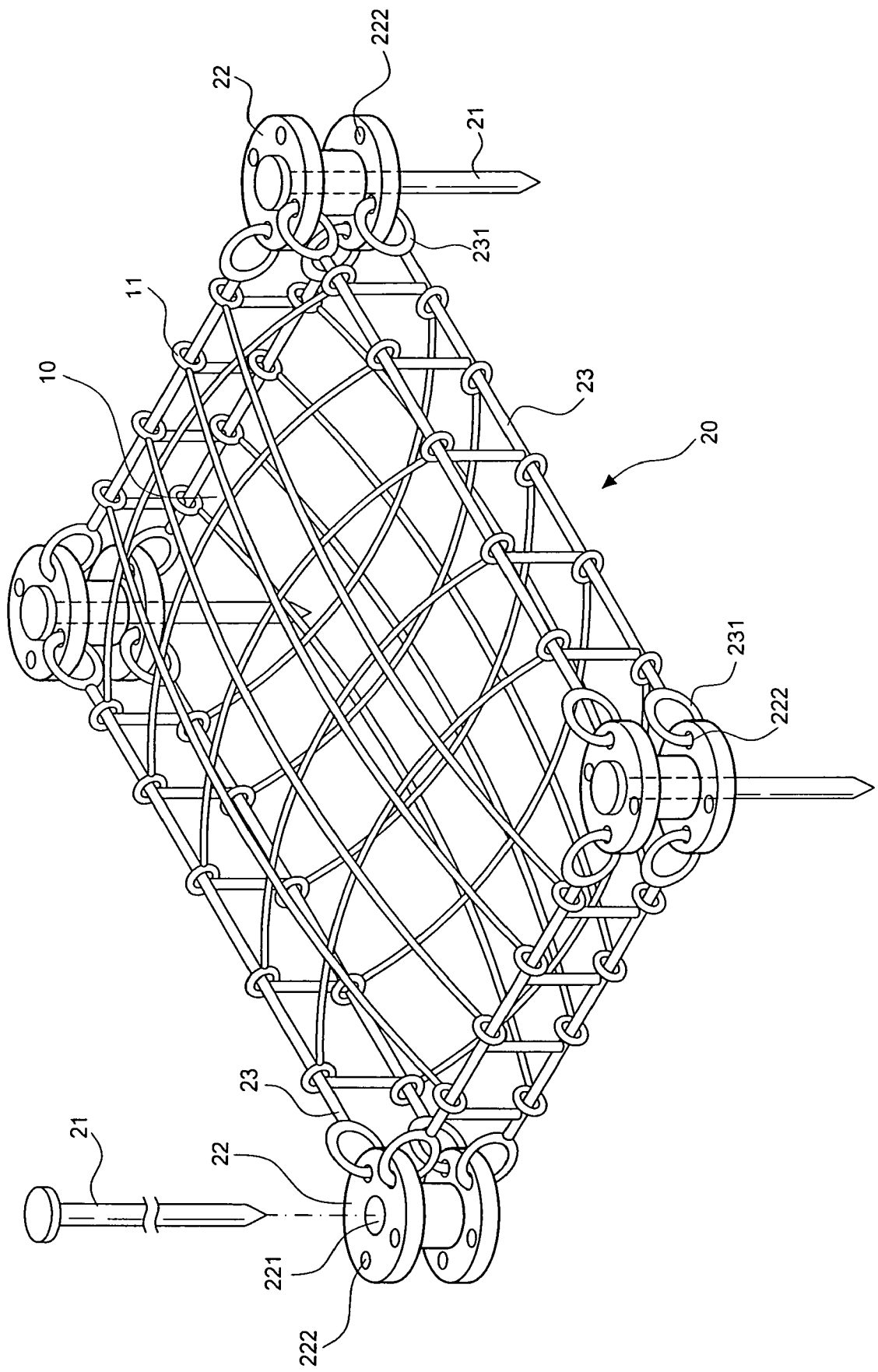
FIG. 1 is a perspective view of a first preferred embodiment of the invention.
Figure 1A:
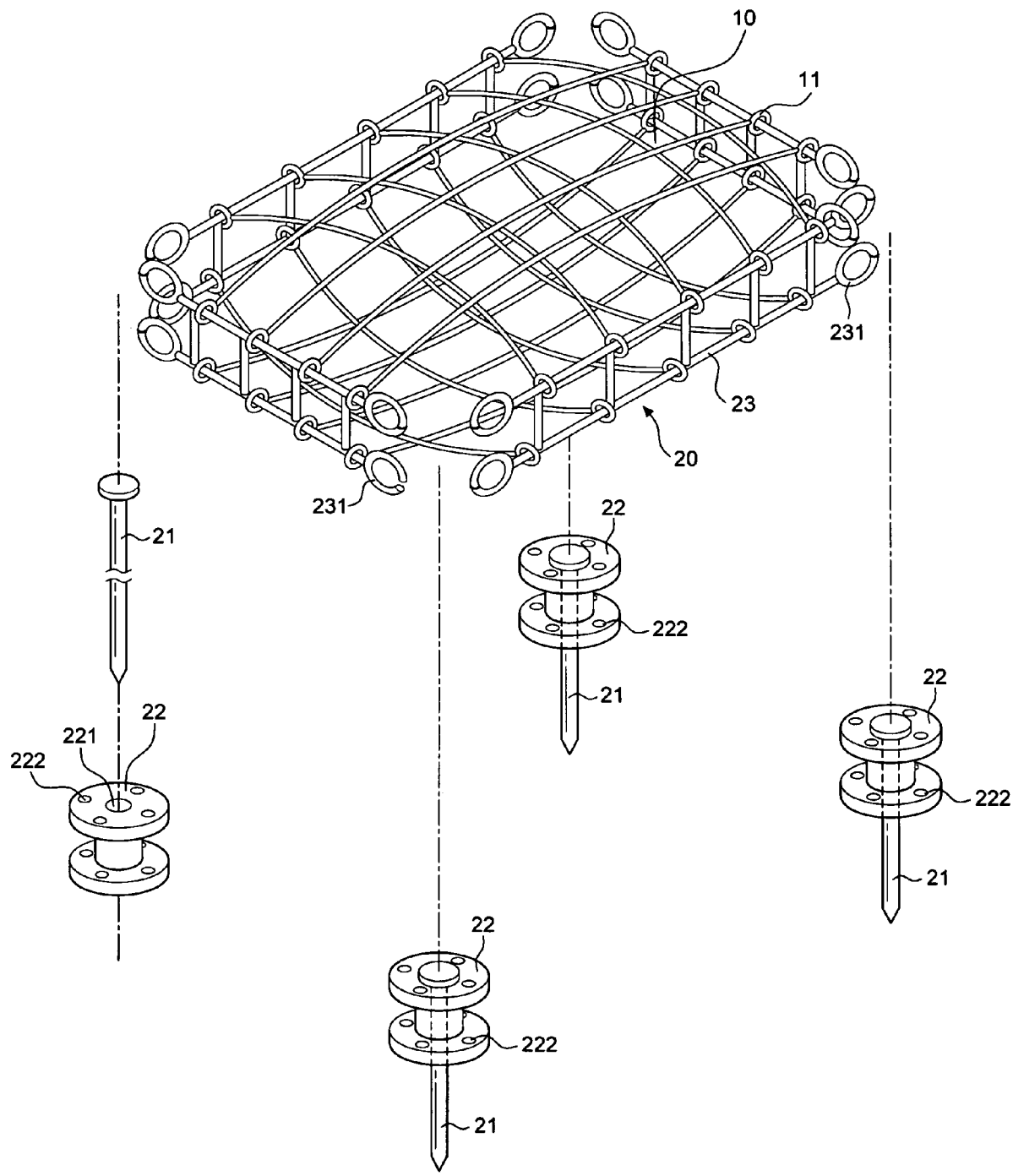
FIG. 1A is an exploded view of a first preferred embodiment of the invention.

The method for conserving soil and water in accordance with the present invention comprises a botanical net body and a soft framework anchored to the botanical net body, and the botanical net body is a hollow three-dimensional sack used as a main body for the vegetation. Soil containing seeds is filled into the hollow portion of the three-dimensional sack, and openings are disposed on its top for planting various different plants. The soft framework provides a stable support for the botanical net body, so that the plants in the botanical net body can grow in a stable environment, and the botanical net body also provides protections to the slope as well. The soft framework and the botanical net body can be manufactured integrally as a whole by a common manufacturing process or manufactured separately or by a combination of the two. As to the type of manufacturing process, it depends on the object such as hillside lands, constructions, or river banks, etc.

The botanical net body is a composite body comprised of several net layers and its geometric shape is arbitrary without any limitation, and the net layers could be soft and strong net layers. The soft net layer is made of a soft meshed material such as a cage meshed material or a steel rope and has straws constituting the surface and earth fabric similar to a woven layer sewed onto the surface. The arrangement of meshed materials and earth fabrics can be arranged in several different ways: straw at the top, meshed material in the middle, and earth fabric at the bottom; or meshed material at the bottom, and earth fabric and straw at the top; or meshed material at the top and earth fabrics and straw at the bottom. The earth fabric and straw used in this embodiment are bags filled with soil, and the earth fabric has a long-term soil conservation effect, so that the soil filled in the sack will not run off. The straw has a short-term soil conservation effect with the functions of preserving heat and moisture. Further, after the straw becomes corrupted, the corrupted straw serves as a fertilizer for the plants and promotes the vegetation effect. The difference between the strong net layer and the soft net layer resides on the meshed material only, and the meshed material uses steel and iron wires to produce the meshes. Since the net body is a three-dimensional hollow with a convexly curved surface separately disposed at the top and the bottom, therefore the meshed material of the strong net layer must produce the curved surfaces first, and then adopt the joint sewing of the earth fabrics, which is the same as that for the straw and the soft net layer. There is another net body that uses a strong steel or iron material to make the meshes, but they are similar to the circular, elliptic or triangular rings connected in series like an iron chain or an iron chain. And these net bodies have soft net layers instead of strong net layers. The required curved surface is produced by adjusting the length of the connecting rings or the gap between the rings. The rest is same as the jointly sewed layers of earth fabrics and straw as described above.

The botanical net body is made by combining soft or strong net layers. The combining method can be a net layer being woven by a soft wire such as a steel rope or wound by a strong wire such as a steel or iron wire, and connecting rings are added and fixed onto the soft framework. A middle connecting component is used to combine the net layer into a three-dimensional hollow. Meanwhile, the middle connecting component can be a soft structure or a strong structure. The soft structure uses strong wires with rings at both ends, and the rings are connected to form a frame while the shape of such frame can be changed freely by rearranging the rings. The strong middle connecting component can be made by the same kind of wire to form a fixed frame, but its shape cannot be changed freely. In the meantime, rings are set separately at each corner for connecting the multidirectional connecting rings of the soft framework. Of course, the middle of the frame may add some rings, such that the botanical net body can be combined securely with the soft framework. No matter which method is used to constitute the net body for growing plants, the best method is to build a soft net layer at the bottom of the net body because the soft layer can use the weight of the filled soil to attach the bottom of the soil on the slope and adjust the size of the soft net layer according to the geometric shape of the slope. As a result, the convexly curved surface is attached closely with the soil of the net layer at the top of the net body. If the slope of a hillside is used, the best method is still to use the soft net layer because the adjustment of the convexly curved surface is superior to the strong net layer. Furthermore, the net body always reserves an opening for filling soils, and the sealing of the opening is easier after the soil is filled in the soft net layer. However, it is better to use the strong net body for the net body that can beautify a construction and combine a construction or shape the construction. The description above illustrates the manufacturing method of the soft framework independent to the net body. Another method for manufacturing the botanical net body uses the connecting elements between the rings of the soft framework as the middle connecting component of the net layer to wind the net layer. There are several ways for the manufacturing. Firstly, the net layers at the top and bottom of the net body and the connecting elements between rings are formed into an open pocket and then connected to the anchored multidirectional connecting rings, and finally the pocket is filled with soil for the vegetation, and wires are used to seal the opening. The second method combines the multidirectional connecting rings and the connecting elements between rings, and then the wires thereon are connected to the net layer at the top and bottom of the net body as an open pocket, and the whole structure is moved to the site and anchored by the anchoring element. After the anchoring is completed, soil is filled for vegetation, and wires are used to seal the opening. The third method combines the bottom of a net of the net body with the connecting elements between the multidirectional connecting rings and the boards to combine the components, and the structure is moved to the site and anchored, and wires are used to tie the net material as the top and soil is filled gradually for the vegetation. The opening is sealed immediately after each net body is completed. It is worth to note that a sufficient extension length should be reserved for manufacturing the net layer of the net body. Thus, when the soil is filled for the vegetation, the bottom layer can be attached as much as possible with the soil. The top layer forms a protruded earth structure, and the overall completed structure is similar to a wavy hill.

The overall assembly of the botanical net body is divided into two kinds: a single structure and a stacked structure. The single structure has separate net body, the front, rear, left and right of the structure. The periphery of the net body is connected to the soft framework to form a ditch at the net body. The ditch is reserved for a drainage or for a preliminary pile. If the piles are set intensively, these piles can serve as a windproof fence during the growth of the plants. Another method is to refill the soil and then use the soft net layer to cover the structure for the vegetation, and the soft net layer uses wires or clamped wires to tie the periphery of the net body. To avoid forming a longitudinal ditch that will cause erosions, the layers of each net body should be arranged alternately. The so-called stacked layer of the net body stacks the bottom of one layer of a net body onto the top of one layer of another net body, or the right side of a layer of a net body is disposed adjacent to the right side of another net body. The straight wires or clamped wires are used for tying while the model is similar to the arrangement of fish scales. This method favors the stagnant water to avoid the water to be centralized quickly, and thus preventing possible erosions and damages.

The methods for combining the vegetable of the botanical net body and the net body are related directly. The net layer independent of the soft framework directly uses the middle component to combine with the botanical net body, and its vegetation can be growth after the seeds of various different plants are filled into the net body, the structure is moved and anchored to the site. After the anchored soft framework is combined, an opening can be set on the net body for planting nursery-grown plants or climbing vines. After the plants are fully grown, similar method is used to introduce the plants to the site. Of course, the plants can be moved to the site after the soil is filled or the plants are planted in the net body, and combined with the soft framework to form the net body. The fertile soil containing seeds is filled into the hollow pocket after the soft framework is anchored, so that the seeds can be nourished and grown at the site. Similarly, an opening is built on the net body for planting nursery-grown plants, and the planting method is to plug the nursery-grown plants into the net body covered by the earth fabrics. In addition to the aforementioned methods, the preliminary piles can be piled onto the net body or cuttage is performed for the vegetation. In general, the net body serves as a foundation for nurturing the plants. Not only using the fertile soil containing seeds to bud the plants, but also providing the nutrients required for growing the nursery-grown plants by the fertile soil and the special materials such as the earth fabrics and straws of the net body are good foundation for cohering protophyte seeds. Therefore, even if the plants are not grown as expected, a large quantity of protophyte seeds can be grown. In the meantime, the characteristics of the good soil conservation of the net body and the fertile soil provide the required nutrients and thus the protophytes can be grown rapidly.

The soft framework is comprised of three components: an anchoring element, a multidirectional connecting ring, and a connecting element between rings. The anchoring element of the soft framework is the main source for supporting the botanical net body and comes with different configurations for different sites. For example, the botanical net body must fit the geometric shape of a slope when it is used for hillside lands and the anchoring element is selected according to the nature of soil. For example, a side slope has a slide at its deeper layer, and thus a prestressed anchor is generally adopted to prevent or suppress the slide. As to the side slope with a shallower layer or without a slide phenomenon, the anchor can be a rock nail or a soil nail to fit the geological rock or soil. Further, a grouting anchor rod can be used for the conditions that do not require a large pull or push resistance. It is worth to note that the prestressed ground anchor or anchor rod must be one of the anchoring elements having a pressure supporting board, and this method preferably installs a multidirectional connecting ring in addition to the pressure supporting board at a portion of prestressed anchor and then buries both into the anchor head. For the second preference, the multidirectional connecting ring is directly used as the supporting board, and the portion of the anchoring element is buried jointly into the anchor head. As to the grouting anchor, there is no supporting board and anchor head, and thus a multidirectional connecting ring and a screw for locking the anchor are provided for the connecting elements between the rings. If the grouting anchor is used for the construction, the prestressed anchor is not used unless for special requirements. The special requirements refer to the requirement of an additional force to reinforce the resistance and secure the construction, in addition to the resistance for the construction itself. A preferred embodiment generally used for a construction adopts a short anchor rod buried into the construction or a secured into a hole on the construction by screw bolts and pad boards. It depends on the connecting elements between the rings to use the multidirectional connecting rings. For example, the connecting ring can receive the anchor rod and rod members and sheath the connecting elements between the rings without installing any multidirectional connecting ring. Another type is the so-called anchor rod retaining wall that installs the anchor rod into a soil layer to secure the soil significantly and slurry is spurted onto the surface of the soil layer or a panel is used to cover the surface of the soil layer. Thus, a supporting board can be added or the multidirectional connecting ring is used to directly substitute the supporting board, and the connecting element serves as a preparation for the vegetation. In the present invention, the anchoring element directly receives the force directly transmitted from the botanical net body or the connecting elements between the rings. Therefore, the size, model and anchoring depth of the rod depends on the magnitude of the pulling or pushing force. The pulling or pushing force mainly comes from the friction so produced, but certain constructions use the tensile force of their main body and anchor rod for the support, such as securing screw rods and pad boards for the anchor at the built soil retaining wall. To make the connecting elements between the rings more secured or extend their length, an auxiliary anchor nail is added besides the anchoring element. The auxiliary anchor nail can be a chained connecting element with a hook grouting anchor or a frame that piles a preliminary pile at the bottom of the rod of the connecting elements between the rings to improve the supporting force. The auxiliary anchor nail is preferably not used together with the multidirectional connecting rings, so that more models can be adopted.

The multidirectional connecting ring is comprised of a circular steel or a square steel or iron sheet, and it must be used together with the anchoring element, so that all external force can be transferred onto the multidirectional connecting ring. Meanwhile, it is also a main connecting element of the soft framework. There are several ways of manufacturing the multidirectional connecting rings. The first way is to build several circular rings as a connecting element for the connecting board. The second way is to solder several arc rings. The third way is to build several circular rings or solder several arc rings onto a cylindrical or rectangular pillar. The fourth way is to press a panel into a circular disk and build several circular rings or solder several arc rings. The fifth way is to solder conical rings at the bottom of a panel with an opening. No matter which way is adopted, the center of the panel must have an opening for receiving the anchoring element and integrating the anchoring element as a whole. The name of the multidirectional connecting ring comes from the reason that there are several circular rings and arc rings to be connected with the connecting elements between the rings in different directions, and the multidirectional connecting ring allows the connecting elements between the rings to move freely in different directions, so that it can fit the geometric shapes of the slope and constructions better. There are two ways of connecting the multidirectional connecting rings and the connecting elements between the rings. The first way is a joint manufacture of which the multidirectional connecting rings and the connecting element between the rings are formed first and then moved and anchored to the site by the anchoring element. It also involves the assembling process of the botanical net body, and the detailed description has been given in the section of the botanical net body. The second way is an attached hanging method which anchors the anchoring elements for the multidirectional connecting board, and hangs the connecting elements between the rings. The detailed description of this part is also related to the botanical net body, and thus will not be described further.

The connecting element between the rings is a main component for supporting and connecting the botanical net body. Under a sufficient support and a good connection for the net body, basically any material can be used for the connecting element. To facilitate the manufacture and construction, steel or iron is used preferably for making the strong or soft connecting element. The strong connecting element has a circular link rod disposed on both ends of the steel or iron material, and the circular link rod could be one rod or combined into a frame. The link rods disposed on both ends of the steel or iron material are used mainly for the circular holes or act rings of the multidirectional connecting rings. Both components can be connected by a joint manufacture or an attached hanging as described above. The circular link rod or the frame of the net body serves as a composite middle component for the net layer or a circular ring or clamp tied on the net body. A rod passing through a circular loop can be adopted as well. In addition, several circular loops can be soldered into a rod and served as a connecting element, and its advantage resides on that the hole of the circular loop facilitates the piling of a preliminary pile or the grouting of the anchor. The frame type uses two rod to solder with a vertical rod, wherein a circular loop with a certain solder component is connected to the multidirectional connecting ring. Further, the circular loop is sheathed onto the vertical rod, and its connection with the multidirectional connecting rings could be either a joint manufacture or an attached hanging. For the joint manufacture, the net layer is preferably disposed on the botanical net body, or else the construction for tying the net layer onto the botanical net body after the anchoring will become more difficult. For the attached hanging, a frame acts as the middle structure for combining the net layer, and the botanical net body is jointly manufactured and moved to the site and hung onto the anchored multidirectional connecting rings. In the botanical net body, soil is filled into the three-dimensional hollow at the site for the vegetation, or the plants are planted into the filled soil. The later is one of the transplant methods. The soft connecting element is also made of steel or iron in several ways such as a multi loop made of a steel rope or a chain. The multidirectional connecting ring is connected in the way as described previously by attached hanging and preferably having a circular loop similar to a key chain disposed on both ends to facilitating the hanging. The botanical net body is connected in the way substantially the same as the connection of the strong framework. Of course, it can include the transplant method. It is worth pointing out that the soft connecting element is used for improving its supporting force and an auxiliary anchor nail is usually needed, and the model of the anchor nail is preferably the preliminary piling as described above.

From each component of the aforementioned soft framework, we understand that the whole framework is called a soft framework mainly because the ring and arc rings of the multidirectional connecting rings can be connected in such a way that it can be moved freely in any direction to allow the soft framework to be disposed according to the change of the slope. Further, the soft framework works together with the soft net layer at the bottom of the botanical net body to provide a better attachment with the slope. If the change of the slope is too large to cause a poor attachment, the soft net layer can be extended to achieve a better attachment. The extensibility of the soft net layer can be adjusted at site and an appropriate net layer can be made timely for the replacement, and thus the present invention can be used extensively for the highly changeable slope. Meanwhile, the multidirectional connecting rings and the connecting elements between the rings can be manufactured jointly, and then they are connected softly to provide a tremendous compression to facilitate the whole transportation. Overall speaking, the anchoring element of the soft framework is a major component for positioning, and anchoring the supporting pillar. The model of the anchoring element and the anchoring depth are determined by the nature of the anchoring object and the size and quantity of the botanical net bodies. Similarly, the strength of the circular ring and arc ring of the multidirectional connecting rings and the model and size of the connecting elements between the rings are determined by the quantity of the net bodies. From the overall connection of the botanical net body and the soft framework, both have their independence but also rely on each other. The independency resides on that the net body and the soft framework are manufactured separately and then combined as a whole by the connecting element between the rings or by the multidirectional connecting ring, which provides good conditions for transplanting nursery-grown plants for the vegetation. Its key resides on that the botanical net body is made independently, and the independently made net body with growing seedlings is transplanted, so that it can be laid as a flat lawn on the slope, while providing an immediate protection and achieving the purpose of beautifying the land. As to the reliance, the soft or strong botanical net body is connected to some of the components of the soft framework to form the net body, and these components include the connecting elements between the rings or the multidirectional connecting rings, the connecting elements between the rings, and the soft net layer. Thus, this method must be carried out at site for filling the soil for the vegetation. Compared with the independence, the level of attachment of the slope can be adjusted and thus the soft net layer of the botanical net body can be replaced to provide an appropriate extensibility of the net layer, so as to achieve the purpose of attaching the slope. Regardless of the independence or the reliance, the model of the botanical net body is not limited. If it is necessary to create landscape such as patterns on the slope, the angle and direction of the circular rings or arc rings of the multidirectional connecting rings of the soft framework are adjusted, while the angle and direction of the connecting elements between the rings are adjusted as well, so as to create a base required for the patterns. Various different kinds and colors of plants are planted to form a complete pattern.

The effects of this invention can be described in several aspects. Firstly, the specific characteristics of the botanical net body and the soft framework almost provide unlimited scope of applicability. For example, they can be used for various different geometric shape and nature of a slope or constructions with a retaining wall. Since the components of the net body and the framework for the construction are manufactured in advance and then moved and anchored to the site to reduce tremendous coordination work and expedite the constructions or shorten the construction period. After a three-dimensional structure which is not a flat structure is completed, the structure can obstruct the water flow and prevent the erosions and centralization of the water. Such arrangement can reduce the water construction. Further, the model of the soft framework of the botanical net body can be adjusted to create landscapes, such as the commonly adopted patterns of appropriate plants, and the effect of vegetation can be accomplished by transplanting the nursery-grown plants for the purpose of beautifying the land.

Figure 2:
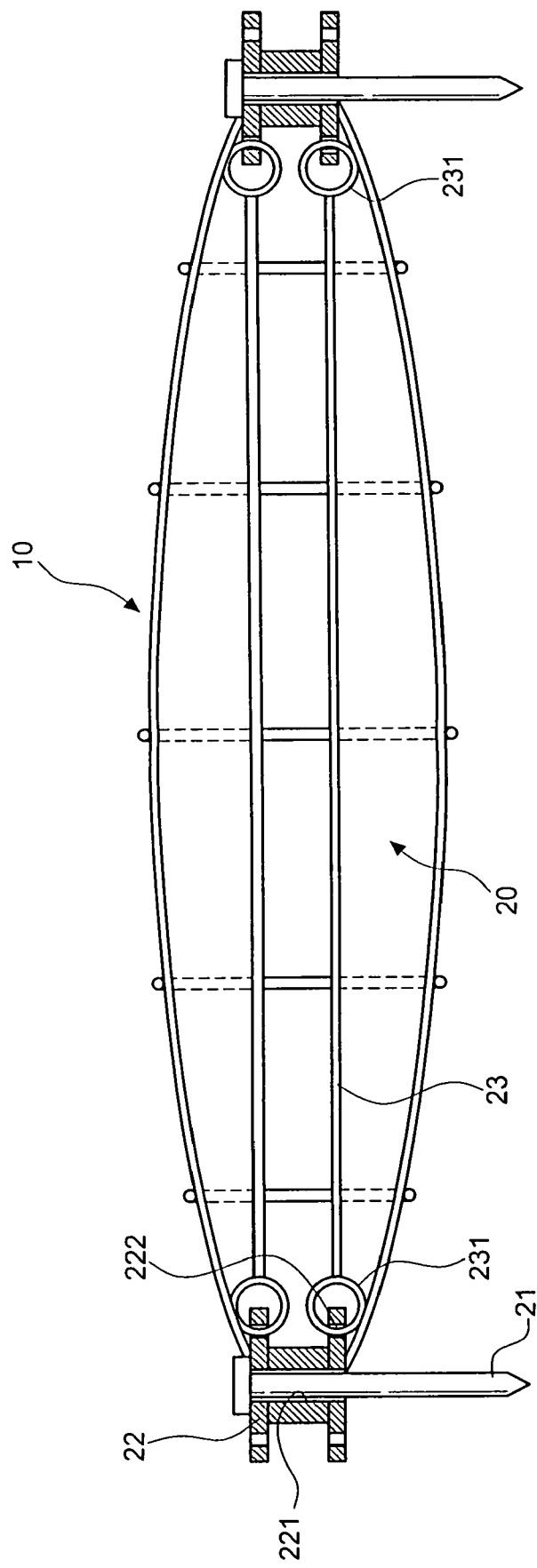
FIG. 2 is a side view of a first preferred embodiment of the invention.

Referring to FIGS. 1 and 2 for a preferred embodiment of the soil and water conservation method that integrates a botanical net body and a soft framework as disclosed in the present invention, the method comprises:

A botanical net body 10 can be designed in any form of a three-dimensional hollow sack having a convexly curved surface separately disposed at the top and bottom of the sack, and fertile soil containing seeds of plants are planted into the sack for the vegetation (as shown in FIGS. 1 and 2).

A soft framework 20 comprises a plurality of anchoring elements 21, a plurality of multidirectional connecting rings 22, and a plurality of connecting elements 23 between the rings, wherein the anchoring element 21 is passed though a positioning hole 221 of the multidirectional connecting rings 22 from the top to the bottom, and then anchored into the ground. A panel of the multidirectional connecting rings 22 includes a plurality of connecting holes 222 for coupling the connecting elements 23 between the rings to form a secured soft framework; and a botanical net body 10 coupled to the soft framework 20 for providing a good and stable base for growing plants.

The botanical net body 10 further uses the connecting elements 23 between the rings as a component for jointly manufacturing the botanical net body 10, and the net body is coupled directly with the multidirectional connecting rings 22 as a whole. In the embodiment, the connecting elements 23 can be divided into two types, and the first type is to manufacture the botanical net body 10 first and then couple the botanical net body 10 with the multidirectional connecting rings 22, and then moved to the desired site. After the botanical net body 10 is anchored by the anchoring element 21, the fertile soil containing seeds of plants are filled for the vegetation. The second type is to anchor the multidirectional connecting rings 22 by the anchoring element 21 at the site first, and then transplant the completed net body for the vegetation and integrated with the multidirectional connecting rings 22 as a whole.

Further, the vegetation of the botanical net body 10 further includes a cuttage method in addition to the method of filling the fertile soil containing seeds of plants, and the cuttage method inserts plants into the net body or piles a preliminary pile through the net body into the stratum or build an opening on the net body for planting plants therein.

Further, the connecting elements 23 between the rings of the multidirectional connecting rings 22 can enhance or assist the anchoring facilities (not shown in the figure), so as to increase the supporting force. The botanical net body 10 further includes a movable connecting ring 11 for facilitating the connection with other structures. The connecting element 23 between the rings further installs a movable hanging ring 231 that can be hung directly onto the multidirectional connecting rings 22.

Figure 3:
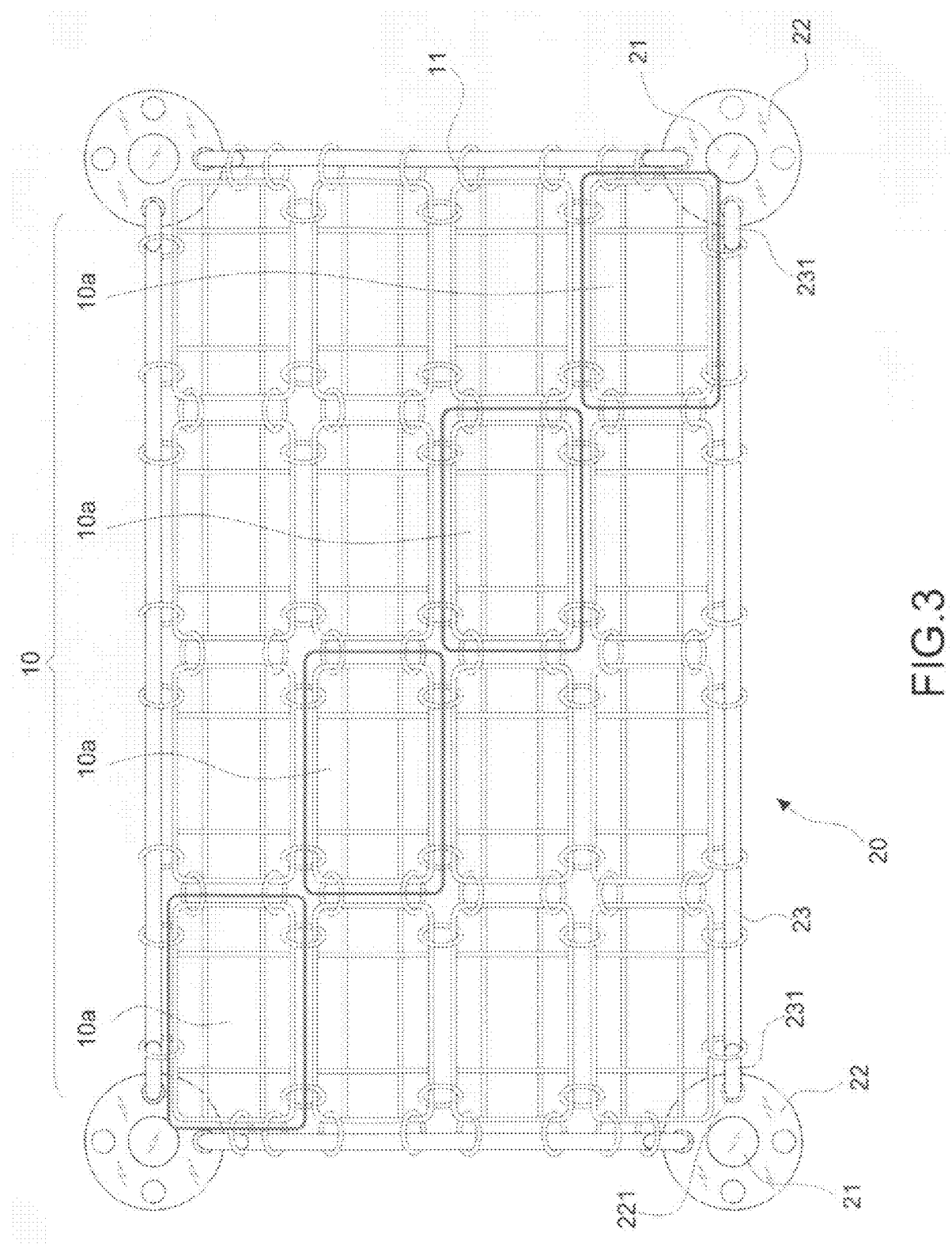
FIG. 3 is a top view of a second preferred embodiment of the invention.

The foregoing botanical net body 10 includes an independent net body disposed on a single soft framework 20. In fact, the botanical net body 10 can have a plurality of small net bodies 10a as shown in FIG. 3, and the quantity and shape of the small net bodies 10a can be set as needed, and each small net body 10a in the botanical net body 10 can be partially connected with the soft framework 20 and partially connected with the periphery of the small net body 10a to form scale-like stacked layers.

Figure 4:
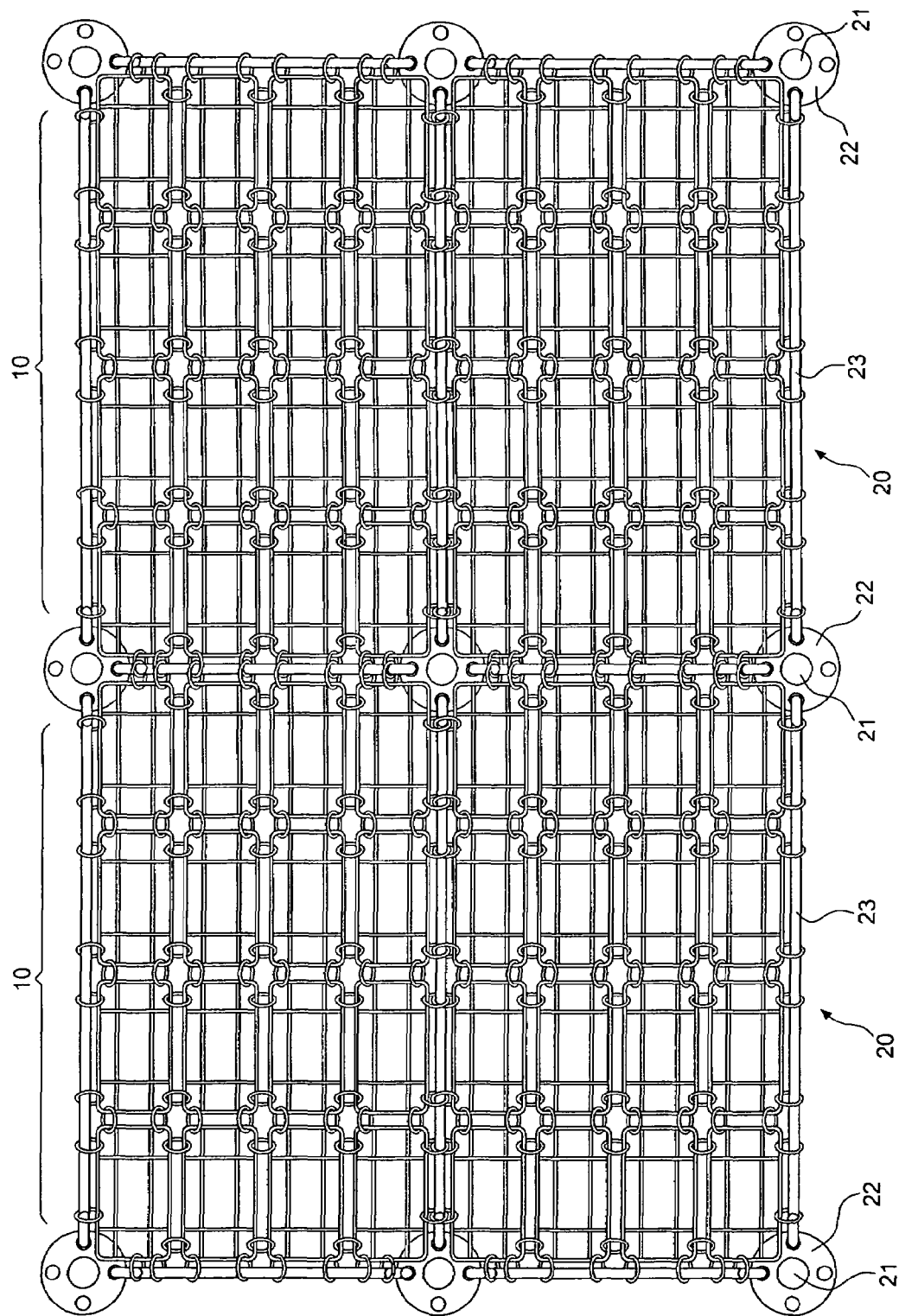
FIG. 4 is a schematic view of a plurality of soft frameworks assembled with each other according to the invention.
Figure 5:
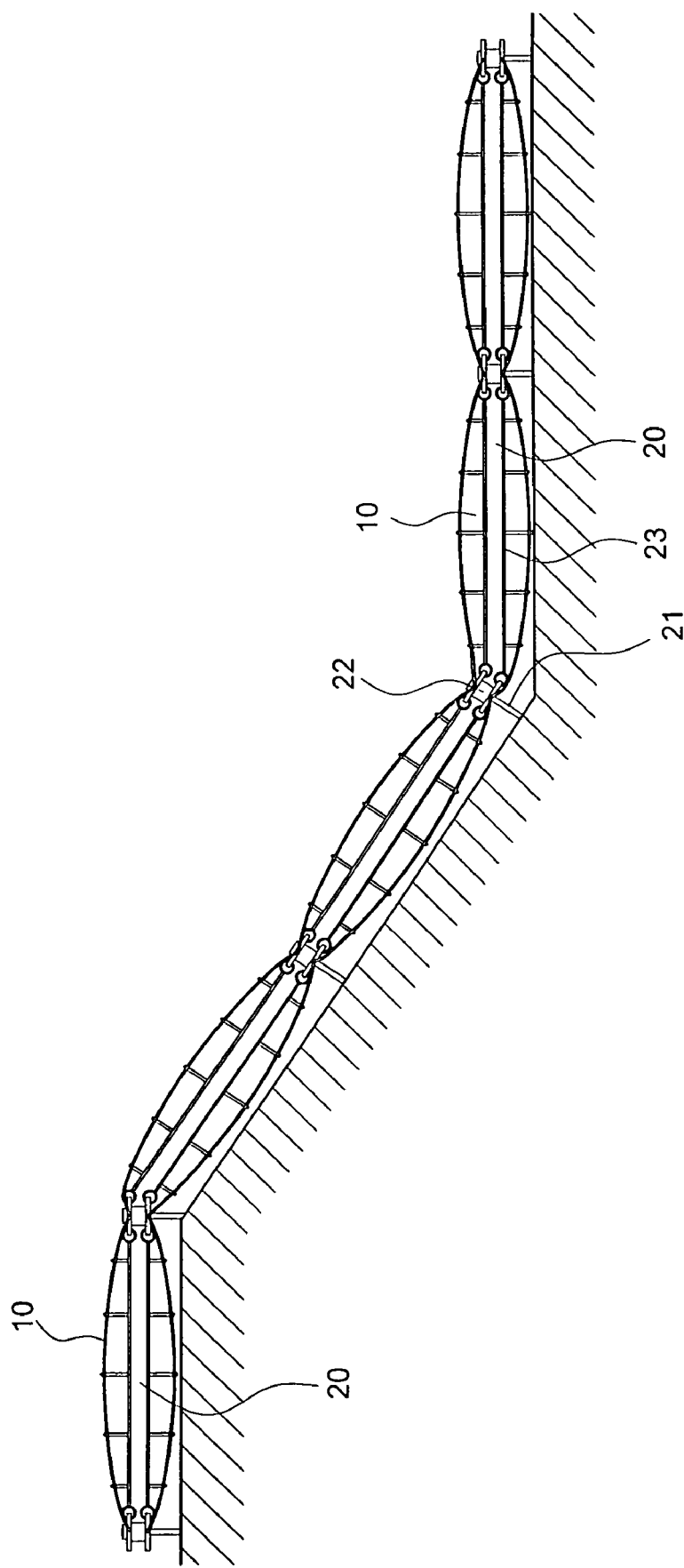
FIG. 5 is a schematic view of a preferred embodiment on different slopes according to the invention.

Referring to FIG. 4, the soft framework 20 and botanical net body 10 in accordance with the present invention can be continuously coupled and installed according to the laid area. Besides, the soft framework system can be attached onto slope according to the inclination of the slope as shown in FIG. 5 to achieve the advantages for its extensive applications and applicability for different locations.

Referring to FIG. 6 for the schematic view of an application of the present invention, the botanical net body 10 further comprises a composite body made of the net layers 12, and the net layer 12 is selected from any one or a combination of the soft net layers and the strong net layers and filled with fertile soil 30, so as to plant the vegetation 40, and the anchoring element 21 is anchored into the ground 50 to constitute a stable structure.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A method for conserving soil and water by integrating botanical net body and soft framework, comprising:
    (a) providing a botanical net body having a first section, a second section, and a cavity therebetween and filled with soil having plant seeds for vegetations;
    (b) providing a soft framework, having a plurality of anchoring elements, a plurality of multidirectional connecting rings said multidirectional connecting rings having a top section, a middle section, and a bottom section; said top, middle, and bottom sections of said multidirectional connecting rings having a positioning hole disposed therethrough and said top and bottom sections having a plurality of connecting holes, and a plurality of connecting elements, said connecting elements having a plurality of movable hanging rings, wherein the anchoring element is positioned through said positioning hole of said multidirectional connecting rings; and
    (c) coupling the botanical net body to the soft framework, wherein said first and second sections of said botanical net body are coupled to said connecting elements and wherein said moveable hanging rings of said connecting elements are coupled to said connecting holes of said multidirectional connecting rings.

2. The method for conserving soil and water by integrating botanical net body and soft framework as recited in claim 1, wherein the botanical net body further uses the connecting element between the rings as one of its components for jointly manufacturing the botanical net body which is directly and integrally coupled with the multidirectional connecting rings.

3. The method for conserving soil and water by integrating botanical net body and soft framework as recited in claim 2, wherein the connecting elements can be divided into two types, and the first type is to manufacture the botanical net body first and then couple the botanical net body with the multidirectional connecting rings, and then moved to the desired site, and wherein, after the botanical net body is anchored by the anchoring element, the fertile soil containing seeds of plants are filled for the vegetation, and wherein the second type is to anchor the multidirectional connecting rings by the anchoring element at the site first, and then transplant the completed net body for the vegetation and integrated with the multidirectional connecting rings as a whole.

4. The method for conserving soil and water by integrating botanical net body and soft framework as recited in claim 3, wherein the vegetation of the botanical net body further includes a cuttage method in addition to the method of filling the fertile soil containing seeds of plants, and the cuttage method inserts plants into the net body or piles a preliminary pile through the net body into the stratum or build an opening on the net body for planting plants therein.

5. The method for conserving soil and water by integrating botanical net body and soft framework as recited in claim 1, wherein the connecting elements between the rings of the multidirectional connecting rings can enhance or assist the anchoring facilities, so as to increase the supporting force.

6. The method for conserving soil and water by integrating botanical net body and soft framework as recited in claim 1, wherein the botanical net body further includes a movable connecting ring for facilitating the connection with other structures.

7. The method for conserving soil and water by integrating botanical net body and soft framework as recited in claim 1, wherein the connecting element between the rings further installs a movable hanging ring that can be hung directly in the connecting holes of the multidirectional connecting rings.

8. The method for conserving soil and water by integrating botanical net body and soft framework as recited in claim 1, wherein the botanical net body and the soft framework can be continuously coupled and installed according to the laid area.

9. The method for conserving soil and water by integrating botanical net body and soft framework as recited in claim 8, wherein the botanical net body and the soft framework can be installed according to the slope.

10. The method for conserving soil and water by integrating botanical net body and soft framework as recited in claim 1, wherein a plurality of small net bodies in the botanical net body can be partially connected with the soft framework and partially connected with the periphery of the small net body to provide for the stacking of said plurality of small net bodies on top of said soft framework.

11. The method for conserving soil and water by integrating botanical net body and soft framework as recited in claim 1, wherein the botanical net body further comprises a composite body made of the net layers, and the net layer is selected from any one or a combination of a plurality of soft net layers and a plurality of strong net layers.

* * * * *